(12) United States Patent
Kim et al.

(10) Patent No.: US 11,545,129 B2
(45) Date of Patent: *Jan. 3, 2023

(54) MULTIPLE SOUND LOCALIZATIONS FOR IMPROVED INTERNAL SOUND SYNTHESIS

(71) Applicant: HARMAN INTERNATIONAL INDUSTRIES, INCORPORATED, Stamford, CT (US)

(72) Inventors: Geon-Seok Kim, Novi, MI (US); David Paul Trumpy, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,228

(22) Filed: Apr. 20, 2021

(65) Prior Publication Data

US 2021/0241750 A1 Aug. 5, 2021

Related U.S. Application Data

(63) Continuation of application No. 16/560,737, filed on Sep. 4, 2019, now Pat. No. 11,011,152.

(60) Provisional application No. 62/727,397, filed on Sep. 5, 2018.

(51) Int. Cl.
| | |
|---|---|
| *G10K 15/02* | (2006.01) |
| *B60Q 5/00* | (2006.01) |
| *G10K 15/04* | (2006.01) |
| *G10H 5/00* | (2006.01) |

(52) U.S. Cl.
CPC .............. *G10K 15/02* (2013.01); *B60Q 5/00* (2013.01); *G10H 5/007* (2013.01); *G10K 15/04* (2013.01)

(58) Field of Classification Search
CPC .......... G10K 15/02; G10K 15/04; B60Q 5/00; B60Q 9/00; G10H 5/007; B60R 16/0373; H04R 3/12; H04R 5/02; H04R 2499/13; H04S 7/302; H04S 7/307
USPC .... 381/1, 17, 56, 63, 86, 99, 103, 104, 107, 381/119, 310
See application file for complete search history.

(56) References Cited

U.S. PATENT DOCUMENTS

| | | |
|---|---|---|
| 5,237,617 A | 8/1993 | Miller |
| 6,343,127 B1 | 1/2002 | Billoud |
| 6,781,933 B1 | 8/2004 | Shigaki |

(Continued)

FOREIGN PATENT DOCUMENTS

| | | | |
|---|---|---|---|
| JP | 2007010810 A | | 1/2007 |
| JP | 2009063968 A | * | 3/2009 |

*Primary Examiner* — Vivian C Chin
*Assistant Examiner* — Friedrich Fahnert
(74) *Attorney, Agent, or Firm* — Brooks Kushman P.C.

(57) ABSTRACT

Synthesizing engine sound in a cabin of a vehicle includes generating a synthesized engine noise audio signal including a plurality of engine order outputs; mixing the engine order outputs in accordance with a first set of gain levels to provide a first channel output; mixing the engine order outputs in accordance with a second set of gain levels to provide a second channel output; using a first localization filter set to provide a first localized output to localize the first channel output as a first sound image at a first location within the cabin, and a second localization filter set to provide a second localized output to localize the second channel output as a second sound image at a second location within the cabin; and mixing the first and second localized outputs into loudspeaker outputs to be applied to the loudspeakers in the cabin.

20 Claims, 4 Drawing Sheets

(56) References Cited

U.S. PATENT DOCUMENTS

| | | | |
|---|---|---|---|
| 7,920,707 B2 | 4/2011 | Tsutsui | |
| 8,872,671 B2 | 10/2014 | Katayama | |
| 11,011,152 B2 * | 5/2021 | Kim | G10H 5/007 |
| 2008/0025518 A1 | 1/2008 | Mizuno et al. | |
| 2008/0192954 A1 | 8/2008 | Honji et al. | |
| 2008/0285775 A1 | 11/2008 | Christoph et al. | |
| 2009/0052682 A1 | 2/2009 | Kuroiwa | |
| 2012/0308056 A1 | 12/2012 | Nakayama | |
| 2014/0016792 A1 | 1/2014 | Christoph | |
| 2016/0029119 A1 | 1/2016 | Valeri et al. | |
| 2018/0277091 A1 | 9/2018 | Niibe et al. | |
| 2019/0379971 A1 | 12/2019 | Singer et al. | |
| 2020/0101896 A1 | 4/2020 | Bastyr | |
| 2020/0207281 A1 | 7/2020 | Niibe et al. | |

\* cited by examiner

MULTIPLE SOUND LOCALIZATIONS FOR IMPROVED INTERNAL SOUND SYNTHESIS

CROSS-REFERENCE TO RELATED APPLICATIONS

This application is a continuation of U.S. application Ser. No. 16/560,737 filed Sep. 4, 2019, now U.S. Pat. No. 11,011,152 issued May 18, 2021, which, in turn, claims the benefit of U.S. provisional application Ser. No. 62/727,397 filed Sep. 5, 2018, the disclosures of which are hereby incorporated in their entirety by reference herein.

TECHNICAL FIELD

Disclosed herein are methods and systems relating to performing multiple sound localizations to improve internal sound synthesis.

BACKGROUND

Vehicles include components that generate noise that is typically audible to drivers or other passengers. For example, a driver may hear noise generated by both an engine and an exhaust system of the vehicle. However, many newly developed engines generate low engine sounds. In particular, turbocharged engines produce very little engine sound. Engine noise may be absent in hybrid vehicles when running on electric power, and electric vehicles may lack engine noise entirely. This absence of engine noise may be unexpected to a driver and may make the driver feel that the engine is not powerful enough. Therefore, a vehicle audio system may generate synthetic noise that represents typical or expected noise generated while operating the vehicle.

SUMMARY

In one or more illustrative examples, a system for synthesizing engine sound in a cabin of a vehicle includes a sound synthesizer configured to generate a synthesized engine noise audio signal output including a plurality of engine orders; a synthesizer output mixer, including a first channel configured to mix the output of the sound synthesizer in accordance with first settings to provide a first channel output, and a second channel configured to mix the output of the sound synthesizer in accordance with second settings to provide a second channel output; first and second localization filter sets, each configured to utilize phase and delay operations to focus sound on a respective subarea when outputs of the respective first and second localization filter sets are applied to loudspeakers, the first localization filter set configured to provide a first localized output to localize the first channel output as a first sound image at a first location, the second localization filter set configured to provide a second localized output to localize the second channel output as a second sound image at a second location; and a mixer configured to combine the first localized output and the second localized output into loudspeaker outputs to be applied to the loudspeakers to generate the first and second sound images.

In one or more illustrative examples, a method for synthesizing engine sound in a cabin of a vehicle includes generating a synthesized engine noise audio signal including a plurality of engine order outputs; mixing the plurality of engine order outputs in accordance with a first set of gain levels to provide a first channel output; mixing the plurality of engine order outputs in accordance with a second set of gain levels to provide a second channel output; using a first localization filter set to provide a first localized output to localize the first channel output as a first sound image at a first location within the cabin; using a second localization filter set to provide a second localized output to localize the second channel output as a second sound image at a second location within the cabin; and mixing the first and second localized outputs into loudspeaker outputs to be applied to the loudspeakers in the cabin.

In one or more illustrative examples, a non-transitory computer-readable medium includes instructions that, when executed by a controller of a vehicle, cause the controller to generate a synthesized engine noise audio signal including a plurality of engine order outputs; mix the engine order outputs in accordance with a first set of gain levels to provide a first channel output; mix the engine order outputs in accordance with a second set of gain levels to provide a second channel output; use a first localization filter set to provide a first localized output to localize the first channel output as a first sound image at a first location within a cabin of the vehicle; use a second localization filter set to provide a second localized output to localize the second channel output as a second sound image at a second location within the cabin of the vehicle; and mix the first and second localized outputs into loudspeaker outputs to be applied to the loudspeakers in a cabin of the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present embodiments are disclosed herein; however, it is to be understood that the disclosed embodiments are merely exemplary of the embodiments that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
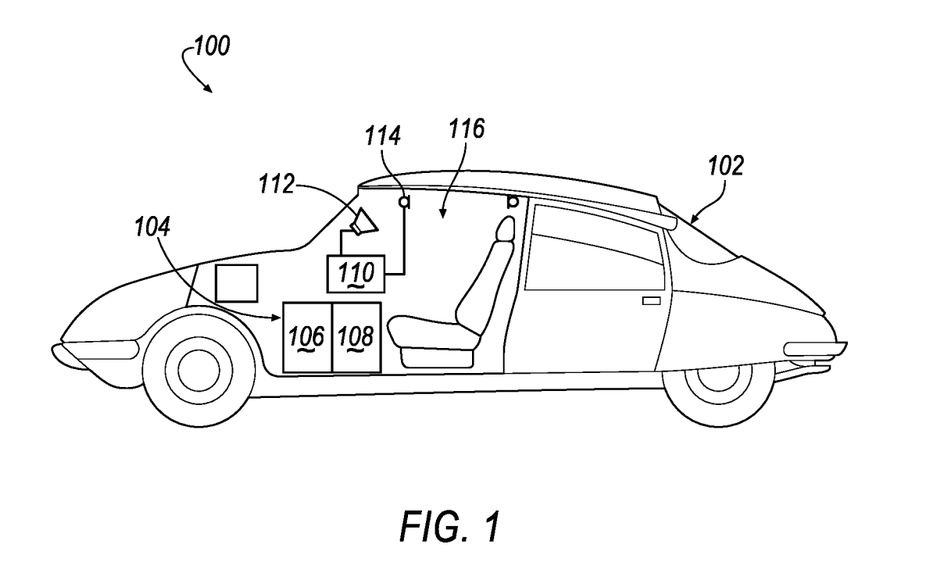
FIG. 1 illustrates an example vehicle system for synthesizing engine sound in accordance with one or more embodiments.

With reference to FIG. 1, a vehicle system 100 for synthesizing engine sound is illustrated in accordance with one or more embodiments. The vehicle system 100 is depicted within a vehicle 102. The vehicle 102 includes a powertrain 104 with an internal combustion engine (ICE) 106 and/or an electric motor 108. The vehicle system 100 also includes a controller 110, a plurality of loudspeakers 112, and, in certain embodiments, at least one microphone 114.

A vehicle occupant may expect to hear noise from the powertrain 104 within an interior cabin or passenger compartment 116 of the vehicle 102 during certain driving modes or maneuvers. Such powertrain noise may be reduced, absent, or otherwise unsatisfying in new vehicle architectures and driving modes. Accordingly, the controller 110 may be configured to generate synthesized engine noise. As input to the engine noise generation, the controller 110 may be configured to communicate with one or more other vehicle controllers (not shown) to monitor various vehicle components and systems, such as the powertrain 104 under current driving conditions. In an example, the controller 110 may monitor engine revolutions per minute (RPM) as an input to the generation of synthesized engine noise and may use the RPM input to identify what frequencies to generate to simulate engine noise. The controller 110 may also adjust the synthesized engine noise signal by providing audible feedback of the vehicle's driving dynamics (e.g., acceleration, cruising, deceleration, reversing, startup, shutdown). This synthesized engine noise may then be provided to the loudspeakers 112 to be projected within the passenger compartment 116. The synthesized engine noise may combine with the actual engine sound (if present) to produce the total engine sound heard by the driver. This total engine sound combines with background noise in the passenger compartment to form the soundscape experienced by the vehicle occupants.

The controller 110 may communicate with other vehicle systems and controllers via one or more vehicle networks by wired or wireless communication. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals. Different signals may be transferred over different channels of the vehicle network. For example, video signals may be transferred over a high-speed channel (e.g., Ethernet) while guiding signals may be transferred over CAN or discrete signals. The vehicle network may include any hardware and software components that aid in transferring signals and data between modules and controllers.

Although the controller 110 is shown as a single controller, it may contain multiple controllers, or it may be embodied as software code within one or more other controllers. The controller 110 generally includes any number of microprocessors, ASICs, ICs, memory (e.g., FLASH, ROM, RAM, EPROM and/or EEPROM) and software code to interact with one another to perform a series of operations. The controller 110 may also include or have access to predetermined data, or look-up tables, that are stored within the memory, according to one or more embodiments. In an example, the controller 110 may maintain a look-up table of frequencies to generate according to engine RPM.

Figure 2:
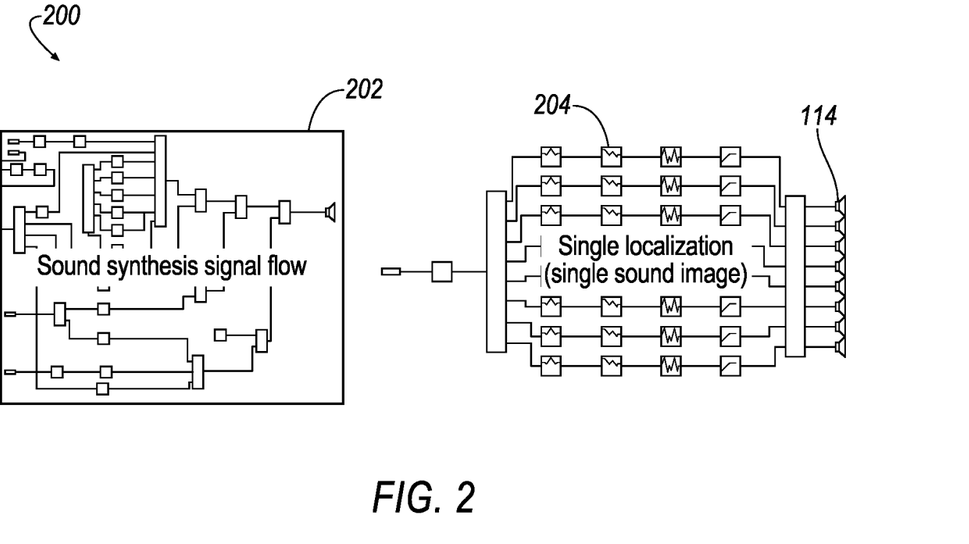
FIG. 2 illustrates an example signal flow including a single sound synthesizer and a single localization filter set.

FIG. 2 illustrates an example signal flow 200 including a single sound synthesizer 202 and a single localization filter set 204. In an example, the sound synthesizer 202 and localization filter set 204 may be implemented using the circuitry and/or software of the controller 110.

The sound synthesizer 202 may be configured to receive inputs from the powertrain 104 and other vehicle 102 systems, and use those inputs to generate synthesized engine noise audio signals. In an example, the inputs may be one or more of engine RPM, a signal derived from a pressure or vibration sensor that is mounted in proximity to the powertrain 104 and/or emissions system, and/or a signal that represents current vibroacoustic emissions of the powertrain 104. In an example, the sound synthesizer 202 processes these signals to generate individual engine orders that may then be individually filtered, equalized, and mixed to be combined as the synthesized engine noise output. In some examples, actual engine noise may additionally or alternately be filtered and provided to the mixer to create or augment the characteristics of the synthesized engine noise.

The localization filter set 204 may be configured to receive the synthesized engine noise audio signal from the sound synthesizer 202 and generate a sound image that appears to emanate from a predefined location of the vehicle 102. To perform the localization, the localization filter set 204 may utilize phase and delay operations to focus sound on a subarea when the outputs of the localization filter set 204 are applied to the loudspeakers 112. In an example, the localization filter set 204 may be formed according to an offline process by which acoustic measurements of the vehicle cabin or passenger compartment 116 are used to calculate filter coefficients. A sound signal may then be applied to the localization filter set 204 such that the filters of the localization filter set 204 use the learned filter coefficients to create a set of outputs that when applied to the loudspeakers 112 produce an image of the sounds at the correct location. In an example, the localization filter set 204 may be used to create an illusion to the listeners that synthetic engine sound is emanating from the engine compartment. In another example, the localization filter set 204 may be used to create an illusion that synthetic engine sound is emanating from the vehicle exhaust.

As the signal flow 200 utilizes a single sound synthesizer 202 and a single localization filter set 204, all the sound, regardless of engine order and frequency, is focused on one area. However, it would be preferable to have multiple sound images that can simulate multiple sound sources of vehicles 102 such as both engine intake and engine exhaust.

Figure 3:
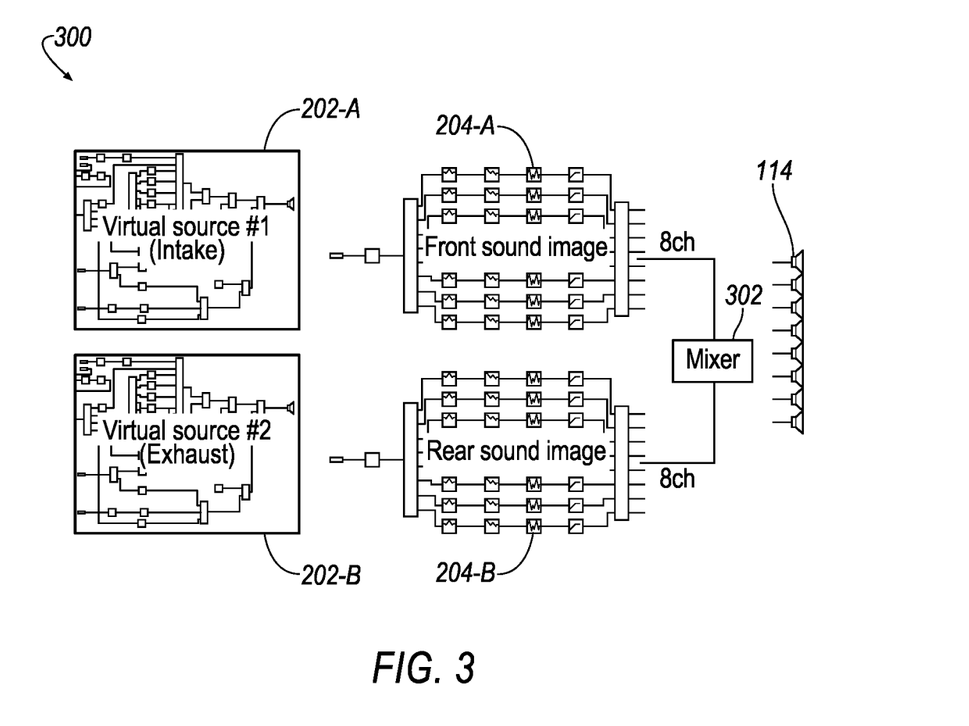
FIG. 3 illustrates an example signal flow including multiple sound synthesizers and multiple localization filter sets.

FIG. 3 illustrates an example signal flow 300 including multiple sound synthesizers 202-A and 202-B (collectively 202) and multiple localization filter sets 204-A and 204-B (collectively 204). As shown, the signal flow 300 includes two sound synthesizers 202, each connected to a respective localization filter set 204. More specifically, a first sound synthesizer 202-A is connected to a first localization filter set 204-A, while a second sound synthesizer 202-B is connected to a second localization filter set 204-B. The outputs of the first localization filter set 204-A and the second localization filter set 204-B are combined by a mixer 302, where the combined outputs from the mixer 302 are reproduced via the loudspeakers 112.

Using the example signal flow 300, each sound synthesizer 202 may represent a virtual sound source such as an engine intake or an engine exhaust, and each sound synthesizer 202 may utilize its own localization filter set 204 to provide the simulated sounds with a different sound image. While only two sound synthesizer 202—localization filter set 204 pairs are illustrated in the signal flow 300, this design could be extended to have further pairs of sound synthesizers 202 with corresponding localization filter sets 204.

Nevertheless, in a system of the form shown in the signal flow 300, there are the same number of sound synthesizers 202 and localization filter sets 204 in the signal flow 300.

Figure 4:
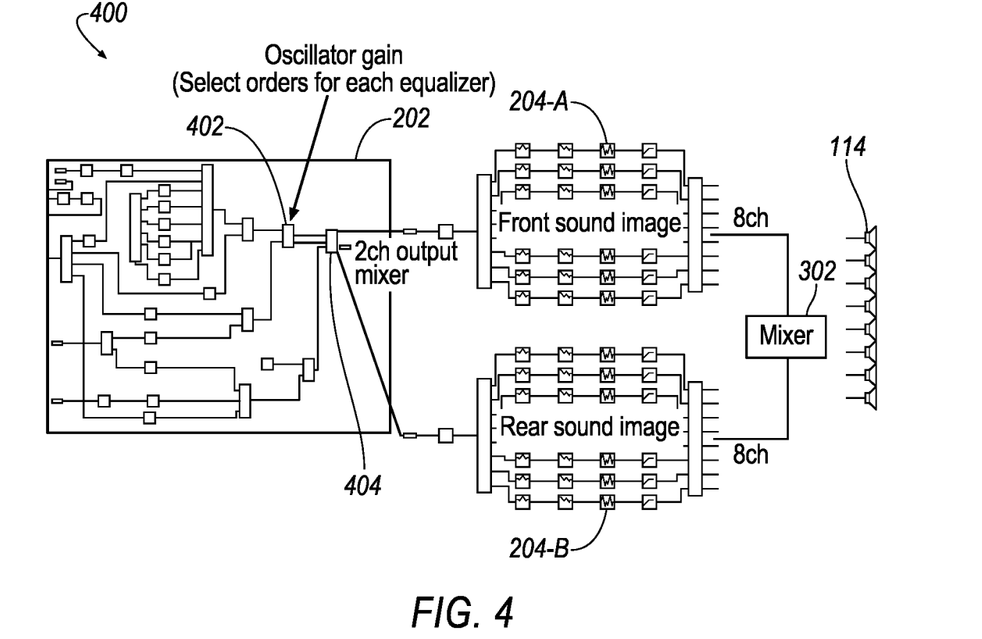
FIG. 4 illustrates an example signal flow using oscillator grouping to utilize a single sound synthesizer with multiple localization filter sets.

FIG. 4 illustrates an example signal flow 400 using oscillator grouping to utilize a single sound synthesizer 202 with multiple localization filter sets 204-A and 204-B (collectively 204). While oscillators are used in many examples herein, it should be noted that the sound synthesizer 202 may be any type of engine noise synthesizer that generates multiple signals that can be combined together, e.g., wave-file-based and/or oscillator based. As shown in the signal flow 400, instead of using multiple sound synthesizers 202, oscillator signals of the single sound synthesizer 202 may be grouped into multiple sets and sent to different localization filter sets 204.

In an example, the sound synthesizer 202 may be configured to generate a plurality of engine orders (e.g., sixteen in one example, but more or fewer are possible). These orders may include a fundamental frequency as well as one or more higher orders. Using different combinations of these orders, multiple outputs from the sound synthesizer 202 may be provided. For instance, to generate an output for use in simulating an engine, a set of orders may be created using more lower order content and less higher order content. As one possibility, to simulate a four-cylinder engine a set of orders may be created that includes second and fourth orders as dominant, while to simulate a six-cylinder engine a set of orders may be created that includes third and sixth orders as dominant. Or, to generate an output for use in simulating an air intake, more higher orders and fewer (or a lower mix level) of lower orders may be included.

As shown, the sound synthesizer 202 may include one or more sets of oscillator gain levels 402 that may be used to adjust the levels of the orders generated by the oscillators of the sound synthesizer 202. These levels, as adjusted, may then be applied to output mixers 404 for each output of the sound synthesizer 202. For instance, to generate two outputs from the sound synthesizer 202, the sound synthesizer 202 may include a two channel mixer 404, where a first channel of the mixer mixes the outputs of the orders in accordance with the oscillator gain levels 402 for the first output, while the second channel of the mixer mixes the outputs of the orders in accordance with oscillator gain levels 402 for the second output.

While multiple virtual sounds may be created using a single sound synthesizer 202, similar to as shown in the signal flow 300, multiple localization filter sets 204 may be used to provide location of the multiple sound images. In an example, each output of the sound synthesizer 202 may be provided to its own localization filter set 204 to allow for the localization of the outputs to be performed separately. As with the signal flow 300, the outputs of the multiple localization filter sets 204 may be combined using the mixer 302 and amplified to drive the loudspeakers 112.

Thus, the sound synthesizer 202 may be used to create both a front sound stage and a rear sound stage, while using a single set of engine order oscillators. Notably, the concept shown in the signal flow 400 of using a sound synthesizer 202 to generate multiple outputs saves memory and other resources of the controller 110, as compared to the approach shown in the signal flow 300 of using a different sound synthesizer 202 for each output.

Figure 5:
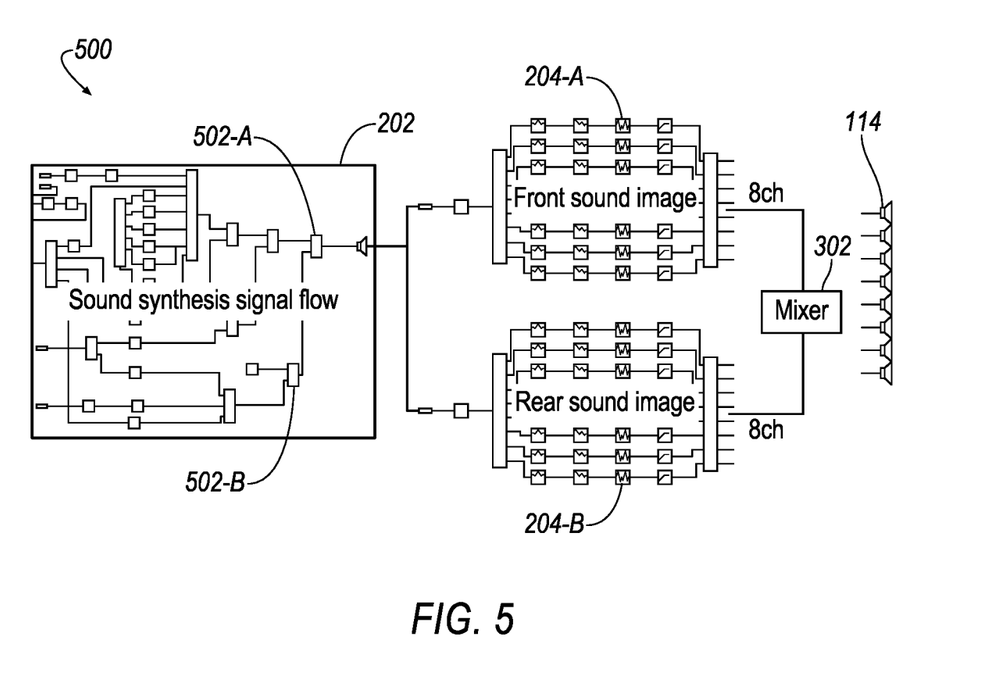
FIG. 5 illustrates an example signal flow using multiple localization filters to utilize a single sound synthesizer with multiple localization filter sets.

FIG. 5 illustrates an example signal flow 500 using multiple synthesizer filters 502-A and 502-B (collectively 502) to utilize a single sound synthesizer 202 with multiple localization filter sets 204-A and 204-B (collectively 204). Similar to the signal flows 300 and 400 discussed in detail above, in the signal flow 500 multiple localization filter sets 204 may be used to generate multiple sound images from multiple outputs of the sound synthesizer 202.

However, as compared to the multiple sets of engine order oscillators and mixed outputs provided in the signal flow 400, each output of the sound synthesizer 202 in the signal flow 500 is generated by performing different filtering of a monaural output of the sound synthesizer 202. In an example, the synthesizer filter 502-A may be a high-pass filter applied to the output of the sound synthesizer 202 to generate a front vehicle soundstage, and the synthesizer filter 502-B may be a low-pass filter applied to the same output of the sound synthesizer 202 to generate a rear vehicle soundstage. The high-pass filter may be used for the front soundstage to include more of the higher engine orders consistent with an engine intake, while the low-pass filter may be used for the rear soundstage to include more of the lower engine orders consistent with an engine exhaust.

It should be noted that this is but one example, and the monaural output of the sound synthesizer 202 may be applied to more or different synthesizer filters 502 including, but not limited to, high pass filters, low pass filters, band pass filters, notch filters, combinations of filters, complex equalizations, and so on.

Thus, similar to as shown in the signal flow 400, using a sound synthesizer 202 to generate multiple outputs via the synthesizer filters 502 saves memory and other resources of the controller 110 as compared to the requirements of the approach shown in the signal flow 300 of using a different sound synthesizer 202 to produce each simulated engine sound output.

Figure 6:
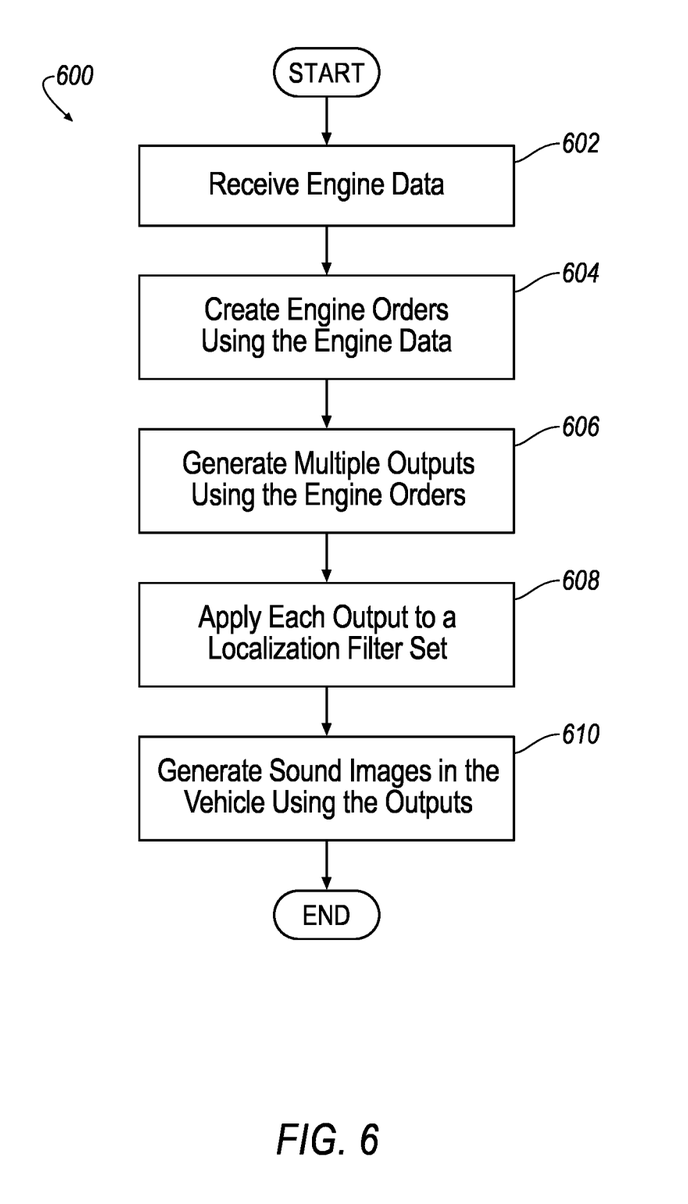
FIG. 6 illustrates an example process for using a sound synthesizer with multiple localization filter sets.

FIG. 6 illustrates an example process 600 for using a sound synthesizer 202 with multiple localization filter sets 204. In an example, the process 600 may be performed using the vehicle system 100 performing according to the signal flows 400 or 500 discussed in detail above.

At operation 602, the controller 110 receives engine data. In an example, the controller 110 receive inputs from the powertrain 104 and other vehicle 102 systems and uses those inputs to generate a synthesized engine noise audio signal. These inputs may include one or more of engine RPM, a signal derived from a pressure or vibration sensor that is mounted in proximity to the powertrain 104 and/or emissions system, and/or a signal that represents current vibroacoustic emissions of the powertrain 104.

At operation 604, the controller 110 creates engine orders using the engine data. In an example, a sound synthesizer 202 of the controller 110 processes the signals received at operation 602 to generate individual engine orders that may then be individually filtered, equalized, and mixed to be combined as the synthesized engine noise output. In some examples, actual engine noise may additionally or alternately be filtered and provided to the mixer to create or augment the characteristics of the synthesized engine noise.

At operation 606, the controller 110 generates multiple outputs using the engine orders. In an example, as shown in the signal flow 400, the sound synthesizer 202 may include one or more sets of oscillator gain levels 402 that may be used to adjust the levels of the orders generated by the oscillators of the sound synthesizer 202. These levels, as adjusted, may then be applied to output mixers 404 for each output of the sound synthesizer 202. In another example, as shown in the signal flow 500, each output of the sound synthesizer 202 in the signal flow 500 is generated by different filtering of a monaural output of the sound synthesizer 202 using various synthesizer filters 502.

At operation 608, the controller 110 applies each of the outputs of the sound synthesizer 202 to a localization filter set 204. In an example, each output may be applied to a different localization filter set 204 to cause the output to be provided at a different perceived location within the vehicle cabin or passenger compartment 116.

At operation 610, the controller 110 uses the outputs of the localization filter sets 204 to generate sound images in the vehicle cabin or passenger compartment 116. In an example, the outputs of the localization filter sets 204 may be provided to a mixer 302, which in turn created outputs for each loudspeaker 112 to be amplified and used to drive the loudspeakers 112. Thus, a sound synthesizer 202 may be used to generate multiple sound images within the vehicle cabin or passenger compartment 116, thereby saving memory and other resources of the controller 110 as compared to using a different sound synthesizer 202 to produce each sound image. After operation 610, the process 600 ends.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium programmed to perform any number of the functions as disclosed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for synthesizing engine sound in a cabin of a vehicle comprising:
   a sound synthesizer configured to generate a synthesized engine noise audio signal output including a plurality of engine orders, the plurality of engine orders including a fundamental frequency as well as one or more higher order harmonics of the fundamental frequency;
   a synthesizer output mixer, including a first channel configured to mix the output of the sound synthesizer in accordance with first settings to provide a first channel output, and a second channel configured to mix the output of the sound synthesizer in accordance with second settings to provide a second channel output, the first settings defining a first set of the plurality of engine orders to use to generate the first channel output, the second settings defining a second set of the plurality of engine orders to use to generate the second channel output;
   first and second localization filter sets, each configured to utilize phase and delay operations to focus sound on a respective subarea when outputs of the respective first and second localization filter sets are applied to loudspeakers, the first localization filter set configured to provide a first localized output to localize the first channel output as a first sound image at a first location, the second localization filter set configured to provide a second localized output to localize the second channel output as a second sound image at a second location; and
   a mixer configured to combine the first localized output and the second localized output into loudspeaker outputs to be applied to the loudspeakers to generate the first and second sound images.

2. The system of claim 1, wherein the sound synthesizer is further configured to receive engine data from a powertrain of the vehicle to generate the synthesized engine noise audio signal, wherein the engine data includes one or more of engine revolutions per minute (RPM), a signal derived from a pressure or vibration sensor that is mounted in proximity to a powertrain of the vehicle or an emissions system of the vehicle, a signal that represents current vibroacoustic emissions of the powertrain of the vehicle.

3. The system of claim 1, wherein the sound synthesizer is further configured to receive an actual engine noise signal from an engine of the vehicle to create or augment characteristics of the synthesized engine noise audio signal.

4. The system of claim 1, wherein the sound synthesizer is a wavefile-based engine noise synthesizer.

5. The system of claim 1, wherein the sound synthesizer is an oscillator-based engine noise synthesizer.

6. The system of claim 1, wherein the first and second localization filter sets are formed according to an offline process by which acoustic measurements of the cabin are used to calculate filter coefficients, and a sound signal is applied to the first and second localization filter sets such that filters of the first and second localization filter sets use the calculated filter coefficients to create a set of outputs that, when applied to the loudspeakers, produces an image of the sounds at a predefined location within the cabin.

7. The system of claim 1, wherein the first localization filter set is configured to localize the first channel output at a front of the cabin to simulate engine noise, and the second localization filter set is configured to localize the second channel output at a rear of the cabin to simulate exhaust noise.

8. The system of claim 1, wherein the sound synthesizer is further configured to provide an monaural output including the plurality of engine orders, the first settings include a high-pass filter to include higher engine orders consistent with an engine intake, and the second settings include a low-pass filter to include lower engine orders consistent with an engine exhaust.

9. A method for synthesizing engine sound in a cabin of a vehicle comprising:
   generating a synthesized engine noise audio signal including a plurality of engine order outputs, the plurality of engine order outputs including a fundamental frequency output as well as one or more higher order harmonic output of the fundamental frequency output;

mixing the plurality of engine order outputs in accordance with a first set of gain levels specifying first amounts to be applied of each of the plurality of engine order outputs to provide a first channel output;

mixing the plurality of engine order outputs in accordance with a second set of gain levels specifying second amounts to be applied of each of the plurality of engine order outputs to provide a second channel output;

using a first localization filter set to provide a first localized output to localize the first channel output as a first sound image at a first location within the cabin;

using a second localization filter set to provide a second localized output to localize the second channel output as a second sound image at a second location within the cabin; and mixing the first and second localized outputs into loudspeaker outputs to be applied to loudspeakers in the cabin.

10. The method of claim 9, further comprising receiving engine data from a powertrain of the vehicle to use as input to generate the synthesized engine noise audio signal, wherein the engine data includes one or more of engine revolutions per minute (RPM), a signal derived from a pressure or vibration sensor that is mounted in proximity to the powertrain or an emissions system of the vehicle, or a signal that represents current vibroacoustic emissions of the powertrain.

11. The method of claim 9, further comprising one or more of:

generating the synthesized engine noise audio signal using a wavefile-based engine noise synthesizer; and generating the synthesized engine noise audio signal using an oscillator-based engine noise synthesizer.

12. The method of claim 9, wherein the first localization filter set is configured to localize the first channel output at a front of the cabin to simulate engine noise, and the second localization filter set is configured to localize the second channel output at a rear of the cabin to simulate exhaust noise.

13. The method of claim 9, further comprising generating a monaural output including the plurality of engine orders, wherein the first set of gain levels include a high-pass filter to provide higher engine orders consistent with an engine intake, and the second set of gain levels include a low-pass filter to provide lower engine orders consistent with an engine exhaust.

14. The method of claim 9, wherein first settings include the first set of gain levels, and second settings include the second set of gain levels.

15. A non-transitory computer-readable medium comprising instructions that, when executed by a controller of a vehicle, cause the controller to:

generate a synthesized engine noise audio signal including a plurality of engine order outputs, the plurality of engine order outputs including a fundamental frequency output as well as one or more higher order harmonic output of the fundamental frequency output;

mix the plurality of engine order outputs in accordance with a first set of gain levels specifying first amounts to be applied of each of the plurality of engine order outputs to provide a first channel output;

mix the plurality of engine order outputs in accordance with a second set of gain levels specifying second amounts to be applied of each of the plurality of engine order outputs to provide a second channel output;

use a first localization filter set to provide a first localized output to localize the first channel output as a first sound image at a first location within a cabin of the vehicle;

use a second localization filter set to provide a second localized output to localize the second channel output as a second sound image at a second location within the cabin; and mix the first and second localized outputs into loudspeaker outputs to be applied to loudspeakers in the cabin.

16. The medium of claim 15, further comprising instructions that, when executed by the controller of the vehicle, cause the controller to receive engine data from a powertrain of the vehicle to use as input to generate the synthesized engine noise audio signal, wherein the engine data includes one or more of engine revolutions per minute (RPM), a signal derived from a pressure or vibration sensor that is mounted in proximity to the powertrain or an emissions system of the vehicle, or a signal that represents current vibroacoustic emissions of the powertrain.

17. The medium of claim 15, further comprising instructions that, when executed by the controller of the vehicle, cause the controller to generate the synthesized engine noise audio signal using a wavefile-based engine noise synthesizer.

18. The medium of claim 15, further comprising instructions that, when executed by the controller of the vehicle, cause the controller to generate the synthesized engine noise audio signal using an oscillator-based engine noise synthesizer.

19. The medium of claim 15, wherein the first localization filter set is configured to localize the first channel output at a front of the cabin to simulate engine noise, and the second localization filter set is configured to localize the second channel output at a rear of the cabin to simulate exhaust noise.

20. The medium of claim 15, further comprising instructions that, when executed by the controller of the vehicle, cause the controller to generate a monaural output including the plurality of engine orders, wherein the first set of gain levels include a high-pass filter to provide higher engine orders consistent with an engine intake, and the second set of gain levels include a low-pass filter to provide lower engine orders consistent with an engine exhaust.

* * * * *